United States Patent [19]

Paice et al.

[11] Patent Number: 4,674,024

[45] Date of Patent: Jun. 16, 1987

[54] HIGH VOLTAGE MODULAR INVERTER AND CONTROL SYSTEM THEREOF

[75] Inventors: Derek A. Paice, Palm Harbor, Fla.; Charles W. Edwards, Monroeville, Pa.

[73] Assignee: Westinghouse Electric Corp., Pittsburgh, Pa.

[21] Appl. No.: 871,048

[22] Filed: Jun. 5, 1986

[51] Int. Cl.[4] .................................... H02M 7/515
[52] U.S. Cl. ...................................... 363/71; 363/96; 363/137
[58] Field of Search ................ 363/35, 37, 41, 65, 363/71, 96, 115, 136, 137

[56] References Cited

U.S. PATENT DOCUMENTS

| | | | |
|---|---|---|---|
| 3,622,863 | 11/1971 | King | 363/135 |
| 3,636,430 | 1/1972 | Kernick et al. | 363/41 |
| 3,775,663 | 11/1973 | Turnbull | 363/41 |
| 4,084,221 | 4/1979 | Ogata | 363/54 |
| 4,173,779 | 11/1980 | Abbontanti et al. | 363/27 |
| 4,220,896 | 9/1980 | Paice | 315/205 |

FOREIGN PATENT DOCUMENTS

| | | | |
|---|---|---|---|
| 165962 | 9/1984 | Japan | 363/71 |
| 156157 | 9/1984 | Japan | 363/71 |
| 1001389 | 2/1983 | U.S.S.R. | 363/71 |

Primary Examiner—Peter S. Wong
Assistant Examiner—Judson H. Jones
Attorney, Agent, or Firm—C. R. Lorin

[57] ABSTRACT

Low voltage GTO inverter modules are combined to form a high-voltage multi-inverter system by connecting standard modules in a string with isolated DC links. Modular construction is arranged for building multi-phase systems. Voltage control is effected by controlling selected modules on the DC sides, or by pulse-width modulation of the inverter of a selected module.

13 Claims, 22 Drawing Figures

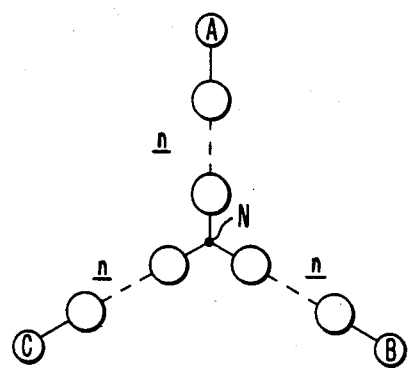
FIG. 6
FIG. 7
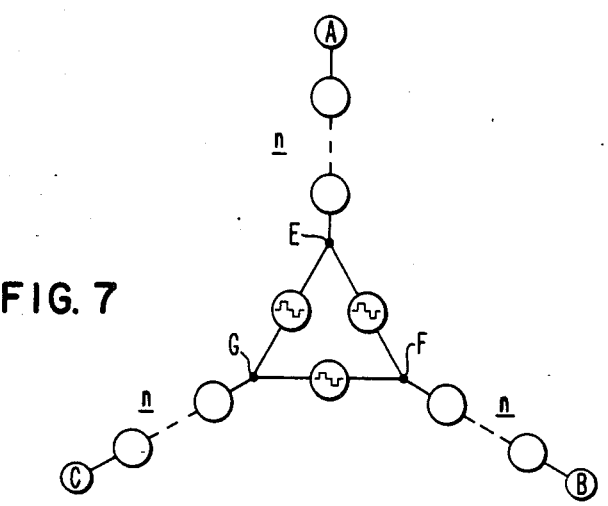
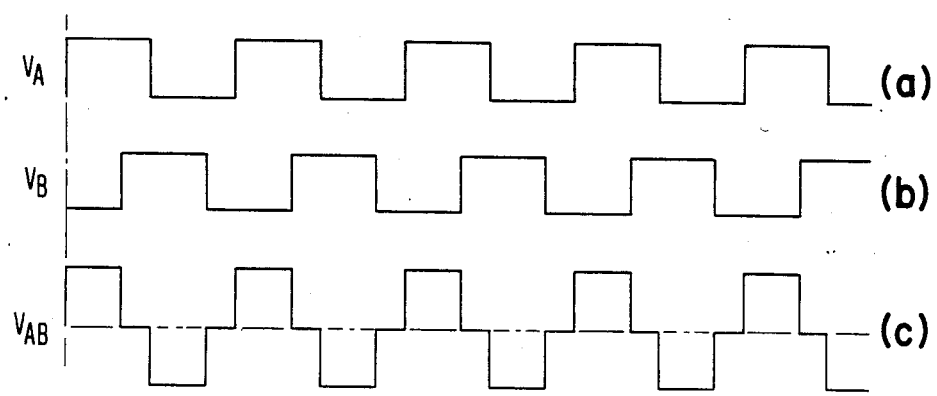
FIG. 7A

HIGH VOLTAGE MODULAR INVERTER AND CONTROL SYSTEM THEREOF

BACKGROUND OF THE INVENTION

The invention relates to a system for converting DC to AC which involves a plurality of inverters, for single phase as well as for multiphase AC output. The invention is applicable to variable frequency inverter motor drives, in particular to high voltage and high power rating motor drives. In this respect, the invention also provides for a control system for such multi-inverter type of DC/AC converter. More particularly, the invention relates to GTO or transistor inverter-type of DC/AC converter systems.

It is known to make a high-voltage thyristor converter by serially connecting thyristor units and to provide separate gate drive units for individual groups of thyristors to serially connect the groups being connected in a chain. See for instance U.S. Pat. No. 4,084,221.

Single pole inverters are known which have received various applications. See for instance U.S. Pat. Nos. 3,636,430; 4,173,779; 4,220,896.

It is known also to group single-pole inverters so as to form a three-phase AC output from a single DC source. See for instance U.S. Pat. Nos. 3,622,863 and 3,775,663.

Low voltage (460 V) variable frequency inverters for motor drives have been developed using inverter "poles" which include switching devices such as GTOs with 1200 V-blocking capability. To extend these inverters for higher voltage (e.g., 4160 V) and higher power rating, it is known to add the power output of various low-voltage inverters by means of output transformers. Thus, in a high-voltage input system, the power is transformed down to a suitable low voltage for the inverters and then transformed back to a high voltage by means of one or more output transformers. An input isolation transformer is normally expected in high-voltage systems; however, the need for an output transformer represents an additional and undesirable cost. This drawback is aggravated because the output transformer has to be capable of increased volts/Hz at low frequency output in order to satisfy the "boost" voltage requirements of motor loads.

Schemes have been proposed to eliminate the output transformer altogether with the design of high-voltage inverter "poles" in which the switching devices are series-connected. This approach is technically feasible but has the disadvantage of requiring some device derating and selection to ensure sharing of voltage across the series string of devices under switching conditions.

The technique proposed according to the present invention eliminates the use of an output transformer for high-voltage motor drives. It ensures good voltage-sharing among a number of low-voltage devices, without the need for special device selection. Moreover, it offers opportunities for multipulse output connections and it simplifies voltage control.

The object of the present invention is to use low-voltage inverters and to combine them so as to achieve higher voltage at the output. Another object of the invention with such a high-voltage multi-inverter system is to allow switching characteristics compatible with the high voltage applications of such a system, for instance load-sharing. A further object of the present invention is to provide a multi-inverter system of flexible design which is modular in nature and adapted to modular design for specific applications, in particular by the selection of a particular grouping of modular units, together with global and refined adjustment of the overall high-voltage characteristic of the system.

SUMMARY OF THE INVENTION

The invention resides in a single-pole modular unit GTO inverter, in a single-phase unitary voltage GTO inverter unit using such single-pole modular unit, and in a high-voltage multi-inverter modular assembly combining a plurality of such GTO inverter units.

The invention also resides in a system for controlling such a high-voltage multi-inverter modular assembly.

The invention involves single phase, three phase, as well as chain-like arrangements of the basic GTO inverter modular unit, and the control thereof.

In the multi-inverter arrangement according to the invention, the DC power supplies to the individual inverter are isolated. When a multisecondary transformer is used, control is done either from the primary side, or on one of the secondary channels thereof, thereby to regulate all or one of the inverter units from the DC side.

More generally, in a high-voltage multi-inverter assembly, voltage control is effected on a selected inverter providing a fraction of the overall voltage output. In a three-phase multi-inverter assembly, each place is modular-built around a basic three-phase unit, and control is effected preferably on such basic three-phase unit, and control may be effected with pulse-width or amplitude modulation.

BRIEF DESCRIPTION OF THE DRAWINGS

FIG. 6 is a high-voltage modular inverter according to the invention built around a string of single-phase modules like in FIGS. 4A, 4B, and a Y-connected three-phase module like in FIGS. 5A and 5B.

FIG. 7 is a high-voltage modular inverter according to the invention built around a delta-connected unit combining single-phase modules like in FIG. 3;

FIG. 7A illustrates with curves the electrical characteristics of the delta-connected unit of FIG. 7;

DETAILED DESCRIPTION OF THE INVENTION

Figures 1, 2:
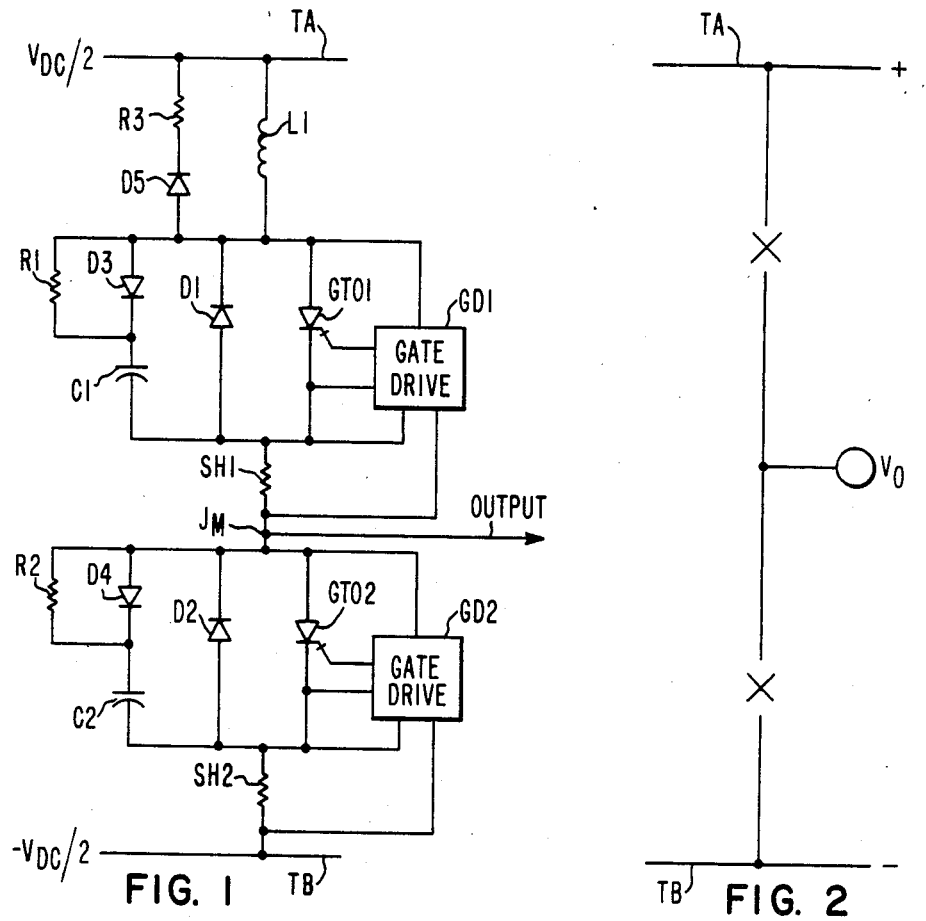
FIG. 1 is a single pole module for an inverter system according to the invention.
FIG. 2 is a schematic representation of the module of FIG. 1.

Referring to FIG. 1, a single-pole module is shown to include at least two GTO devices ($GTO_1$ $GTO_2$) serially connected across DC voltage terminals TA, TB at $+V_{DC}$ and $-V_{DC}$ direct voltage, respectively. The basic organization of a single-pole of a GTO inverter is well known. For the purpose of illustration, the module of FIG. 1 is shown to include a gate drive circuit for each GTO device (GD1 and GD2), an inductor L1 between the positive terminal TA and the positive electrode of $GTO_1$, a diode D1 antiparallel thereto, a snubber circuit comprising a capacitor C1 in series with a parallel combination of a resistor R1 and a diode D3.

The same are found with $GTO_2$ (D2, C2 and R2, D4). In parallel with inductor L1 is a series network formed with a diode D5 and a resistor R3 diode D5 being oriented against TA.

Shunt resistors SH1, SH2 are associated with the respective gating drives GD1,GD2, and with the negative end of each GTO circuit. Thus, SH1 joins the negative electrode of $GTO_1$ to the nodal point $J_M$ and the positive electrode of $GTO_2$, whereas SH2 connects the negative electrode of $GTO_2$ to the negative terminal TB.

Figure 1A:
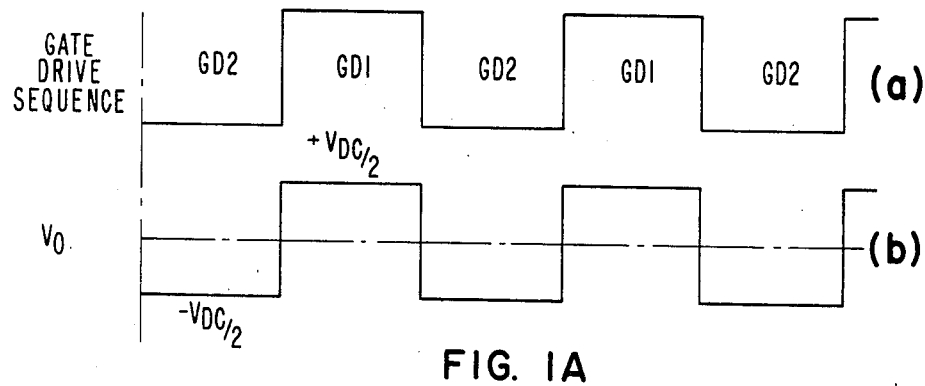
FIG. 1A are curves illustrating the operation of the module of FIG. 1.

The output voltage derived from GD1 and GD2 are controlling is from function point JM. FIG. 1A shows under (a) the successive control of GD1 and GD2. The voltages $+V_{DC}/2$ and $-V_{DC}/2$ of lines TA, TB are applied when the corresponding GTO device is made conductive ($GTO_1$ for TA, $GTO_2$ for TB) during half a cycle of the output voltage. FIG. 1A shows under (b) the resulting output voltage Vo on output line 1 from JM to a point intermediate $+V_{DC}$ and $-V_{DC}$.

FIG. 2 is a symbolic representation of the single-pole module of FIG. 1.

Figure 3:
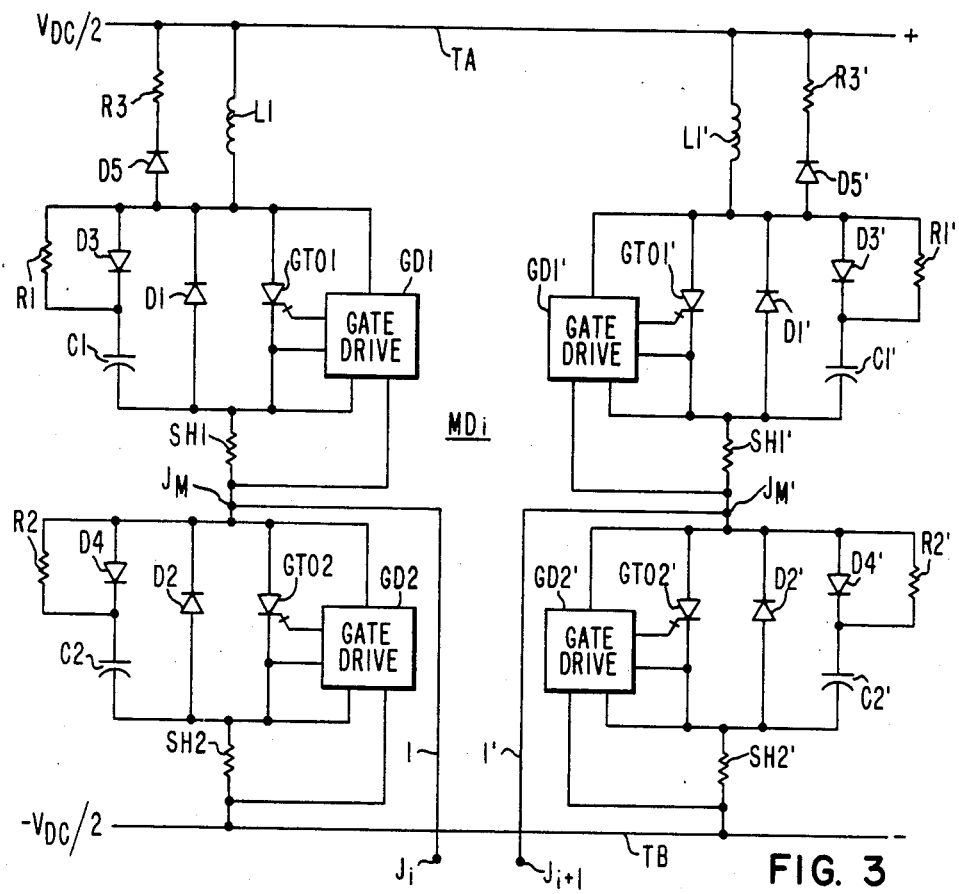
FIG. 3 shows a single-phase inverter module according to the invention.

FIG. 3 shows the combination of two single-pole modules like in FIG. 1 to form a single-phase module MDi. Each single pole ($GTO_1$, GD1, $GTO_2$, GD2), ($GTO_2'$, GD1', $GTO_2'$, GD2',) is the mirror image of the other. From the respective nodal points JM, JM' are derived two output lines 1 and 1', respectively.

Figure 3A:
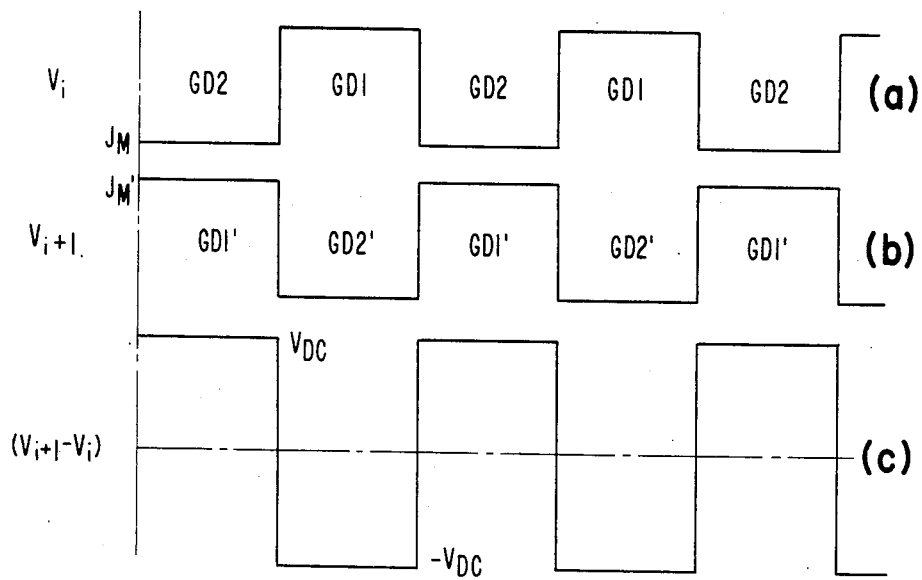
FIG. 3A provides curves illustrating the operation of the module of FIG. 3.
Figure 4A:
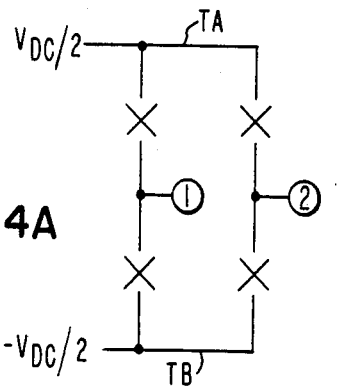
FIGS. 4A, 4B are schematic representations of the inverter module of FIG. 3.
Figure 4B:
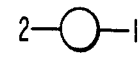

At junction JM is applied a voltage Vi shown under (a) in FIG. 3A which is like under (a) in FIG. 1A. The gate drives GD1', GD2' of the second single-pole module of FIG. 3 are controlled at 180° to the operation of gate drives GD1, GD2 of the first single-pole module. Under (b) in FIG. 3A is shown the resulting voltage Vi+1 at junction JM'. Curve (c) of FIG. 3A shows the voltage between output lines 1, 1' derived at the output of the single-phase module MDi, namely ($V_{i+1}-V_i$). It is observed that, while the voltage $V_o$ of curve (b) in FIG. 1A exhibits a maximum of $V_{DC}/2$ and a minimum of $-V_{DC}/2$ voltage ($V_{i+1}-V_i$) of curve (c) of FIG. 3A has a maximum, positive voltage of $+V_{DC}$, and a minimum, negative voltage of $-V_{DC}$. Lines 1 and 1' lead to junction points Ji and Ji+1 of module MDi, with the understanding, according to the present invention, that several modules of rank i, like MDi, are serially and architecturally assembled to form a modular system having specially designed characteristics, as shown hereinafter. Referring to FIGS. 4A, 4B, the single-phase modular MDi of FIG. 3 is shown schematically in FIG. 4A and symbolically in FIG. 4B.

Without the need for a more extensive representation, like in FIG. 3, it is also proposed to combine three single-pole modules like the one of FIG. 1, rather than two as in FIG. 3, so as to form a three-phase module. In such case a third pair of GTO's, $GTO_1''$, $GTO_2''$ having associated circuitry including gate drives GD1'', GD2'' can be visualized. In such case, the three single-pole circuits are controlled at 120° phase shift (rather than 180° phase shift in the case of FIG. 3).

Figure 5A:
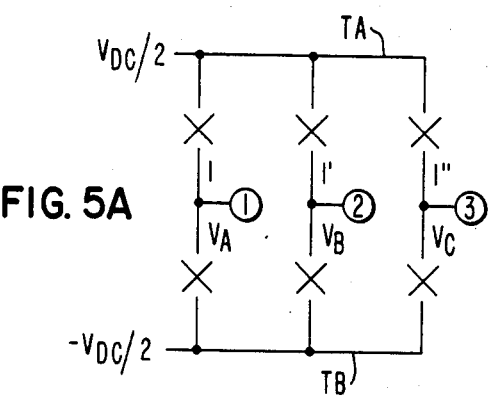
FIGS. 5A, 5B are schematic representations of a Y-connection three-phase inverter module combining single-phase modules like in FIG. 3.
Figure 5B:
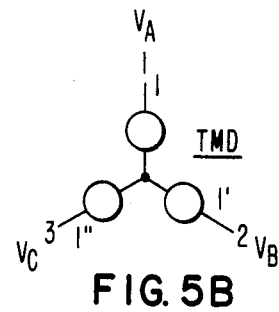

FIGS. 5A and 5B are a schematic and a symbolic representation, respectively, of such three-phase Y-connected GTO module.

Figure 5C:
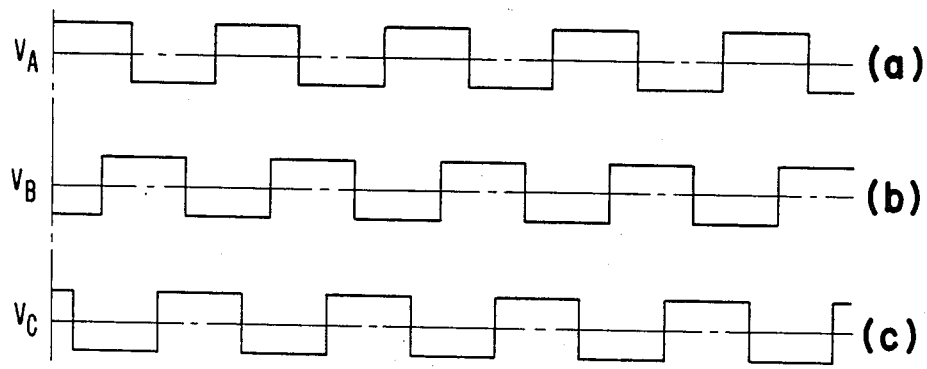
FIG. 5C illustrates with curves the electrical characteristics of the module of FIGS. 5A, 5B.

FIG. 5C shows the three voltage waves derived on output lines 1, 1' (and 1'') for the pulse lines A, B, C, namely voltages $V_A$, $V_B$ and $V_C$, as shown under (a), (b) and (c).

It is the purpose of this invention to assemble a plurality of modules like in FIG. 1, to form a high-tension modular inverter system. As earlier stated, low-voltage (460 V) variable frequency inverters have been developed for motor drives with inverter "poles" including switching devices, such as GTO's which have a 1200 V blocking capability. For higher voltage (e.g., 4160 V), however, and higher power rating, the power outputs of various such low-voltage inverters have been added by means of output transformers, thus forming a high-voltage input system. The power is transformed down to a low-voltage suiting the voltage limitations of the inverters. The output is, then, formed back to a high-voltage by means of one, or more, output transformers. While an input isolation transformer is at the input required for such high-voltage systems and acceptable, it is desirable to dispense with an output transformer, since it represents an additional cost. Such cost is compounded with the fact that the output transformer must be capable of increased volts/Hz at low-frequency output, in order to satisfy the "boost" voltage requirements of motor loads.

The present invention eliminates the output transformer needed for high-voltage motor drives, and ensures good voltage-sharing among many low-voltage devices, without the need for special device selection. Moreover, the invention allows multipulse connections and leads to a more simple voltage control.

Referring to FIG. 6, a three-phase module TMD such as in FIGS. 5A, 5B, is placed at the center of three strings of a Y formed with single-phase modules like MDi in FIG. 3. n modules are aligned in series to form the phases A, B and C.

In each phase the gating drives (GD1, GD2) and (GD1', GD2') of each module MDi are controlled at 120° of the ones of the other phase, as shown in FIG. 5C. If the individual voltage is $(V_{i+1} - V_i)$ for each unit, for the n units the voltage-to-neutral if $n(V_{i+1} - V_i)$.

Referring to FIG. 7, instead of building a string-like phase in a Y-connection scheme, around a Y-connected three-phase module like TMD of FIGS. 5A, 5B, the central three-phase module is here chosen to be a delta-connected module. This is conceived from FIG. 3 by using junction nodes like Ji, Ji+1, belonging to three modules liked MDi, and by connecting them in a triangular fashion by pairs to one another. In such case, as shown in FIG. 7A, the line-to-neutral voltages $V_A$, $V_B$ between EF, EG or GF of curves (a) and (b) in FIG. 5C appear as line-to-line voltages on the side of the triangle. These voltages have a quasi-square shape, as shown by $V_{AB}$ under (c) in FIG. 7A, since the voltages are summed algebraically. Control is at 120° from one unit MDi to the next, as before, only the connections are different, causing the summing effect. The three phases include each a string of n modules like in FIG. 3, which build up a system, up to the desired overall high voltage.

Figure 8:
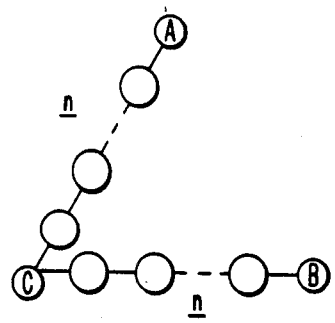
FIG. 8 shows a delta-connected combination of string-like arrangements of single-phase inverter modules like in FIG. 3.

FIGS. 8, 9, 10 and 11 are illustrative of the many combinations of modules that can be combined in string-like basic modules to achieve, under high-voltage, specific three-phase output characteristics. In FIG. 8 the three phases A, B and C are generated by two strings of n modules having one common point (at C) and two open ends at A and B. The two strings are controlled in parallel at a 120° phase shift.

Figure 9:
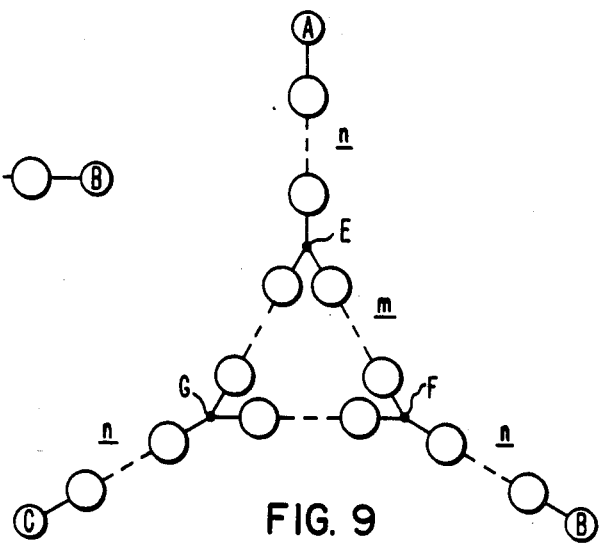
FIGS. 9, 10 show delta and Y combinations of string-like arrangements of modules like shown in FIG. 3.

In FIG. 9, m modules are combined to provide an enlarged delta-connected central three-phase unit, as opposed to what is shown in FIG. 7, and n modules disposed at each summit of the triangle are attached in a string-like fashion as shown.

Figure 10:
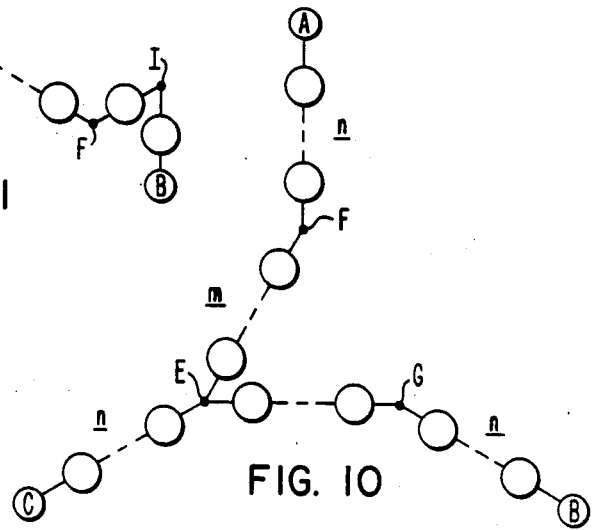

FIG. 10 shows an enlarged star-connected unit made of m elementary units such as modules MDi of FIG. 6, having only two branches A and B, on which n units serially-connected are phase-shifted relative to the m units of the associated branches. The vectorial representation for the compound vectors of phases A and B, will depend both upon the phase-shift angle about junction points F and G (for branches A and B, respectively) and upon the number of units n added relative to the central y of the m units (from junction points E, F and G).

Figure 11:
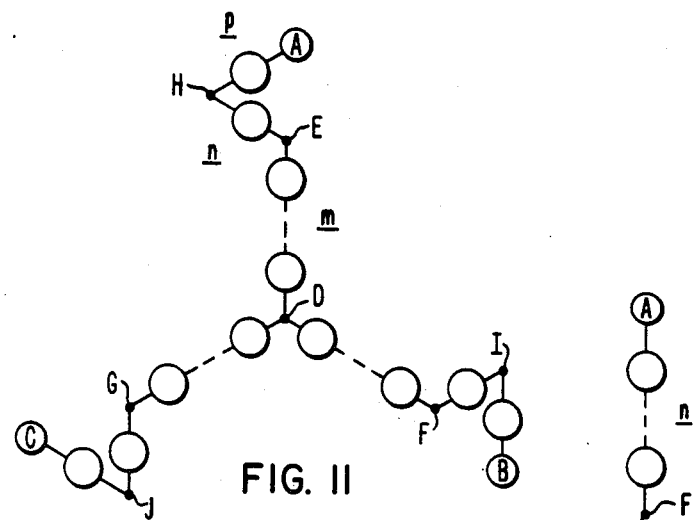
FIG. 11 illustrates how string-like arrangements of modules like in FIG. 3 can be combined to make a zig-zag connection high-voltage modular inverter.

FIG. 11 shows a zig-zag connection of single-phase modules. About the central point O are mounted m units in a Y to points E, F, G (phases A, B, C). Then, n modules, at a selected phase-shift angle are connected in each branch (from E to H, from F to I, and from G to J, respectively). Another phase shift with p modules extends from H, I, J to the end points of the Y thus made about the central point O.

It appears that by combining so many modules, any multi-phase arrangement arrangement can be achieved. The designer will be able to attain any desirable high voltage, and vectorial diagram per phase by choosing the number of base modules like those shown in FIGS. 1 and 3, by controlling the switching cycle in each module of a string, and by adopting any choice of successive orientations from one string to another, or between phases.

Figure 12:
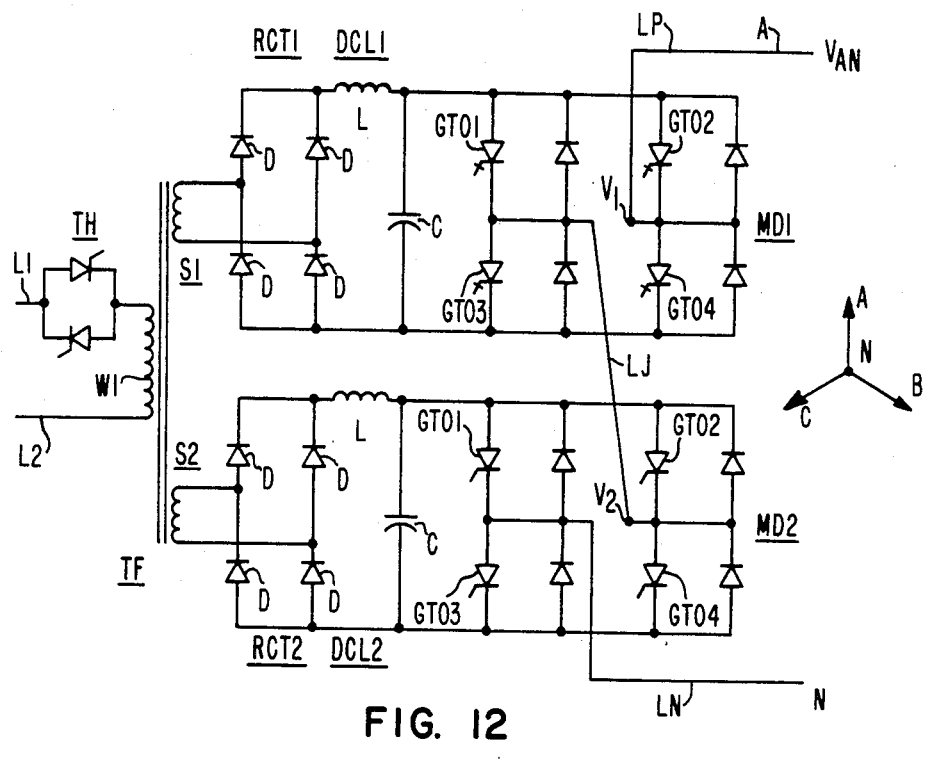
FIG. 12 illustrates another single-phase modular inverter according to the invention, obtained by connecting in a pair two single-pole modules like in FIG. 1, and also illustrates circuitry associated thereto for output voltage control.

The voltage of each module is determined by the voltage in the DC link between terminals TA and TB. Each module is mounted with the proper insulation between individual DC links. As illustrated in FIG. 12 for two modules, the two DC links DCL1, DCL2, have a common high voltage AC input transformer TF, the two secondary channels being isolated from one another.

Considering the two modules MD1, MD2 which are controlled like shown in FIG. 3A, the voltage $+2V_{DC}$ appears between neutral line $L_N$ and phase line $L_P$ for phase A in the illustration, when the two outputs $(J_{i+1} - J_i)$ of FIG. 3, illustrated as V1 and V2 for modules MD1, MD2 of FIG. 12, are serially connected. As shown, line LJ is joining the second end of MD2 (voltage V2 to line $L_N$) to the first end of MD1.

Figure 12A:
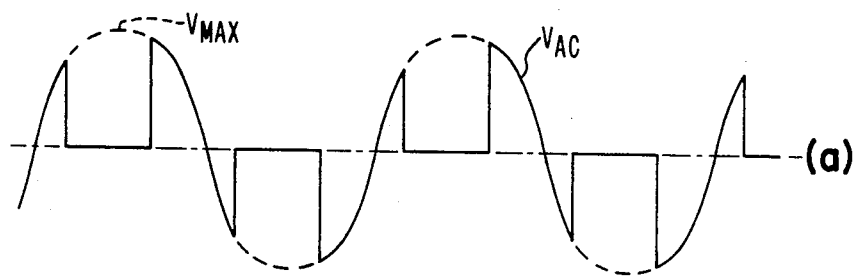
FIG. 12A illustrates with curves the operation of the modular inverter of FIG. 12.
Figure 12A:
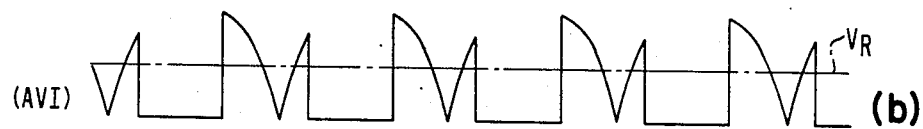

For voltage control purpose, two rectifying thyristors TH are placed on the input line L1 of the AC power supply (L1, L2) on the primary side of input transformer TF. In FIG. 12A, curve (a) shows control of the thyristors with a selected delay firing angle under the applied voltage $V_{AC}$ at the input side. The rectified voltage appears on the primary winding as shown under (b). The average input voltage $V_R$ is the regulated voltage. As shown in the figure, this control of $V_R$ (in accordance with a reference signal selecting the firing angle on thyristors TH) will affect the amplitude of the outputted phase voltage ($V_{AN}$).

Such single voltage control is combined with frequency control, by choosing the desired duty cycle between the two halves of the module (in MD1 as well as in MD2). Three phases like $V_{AN}$ will be associated about the common neutral line $L_N$ to form a Y-connected output, and a series of n such modules, like (MD1, or MD2) will provide the desired high voltage (FIG. 12 being limited to two modules for the sake of simplification). If the output phase lines are connected to an AC motor, a high-voltage motor drive will have been formed which can easily be controlled as a variable frequency, variable voltage (AVI) motor drive system.

Figure 13:
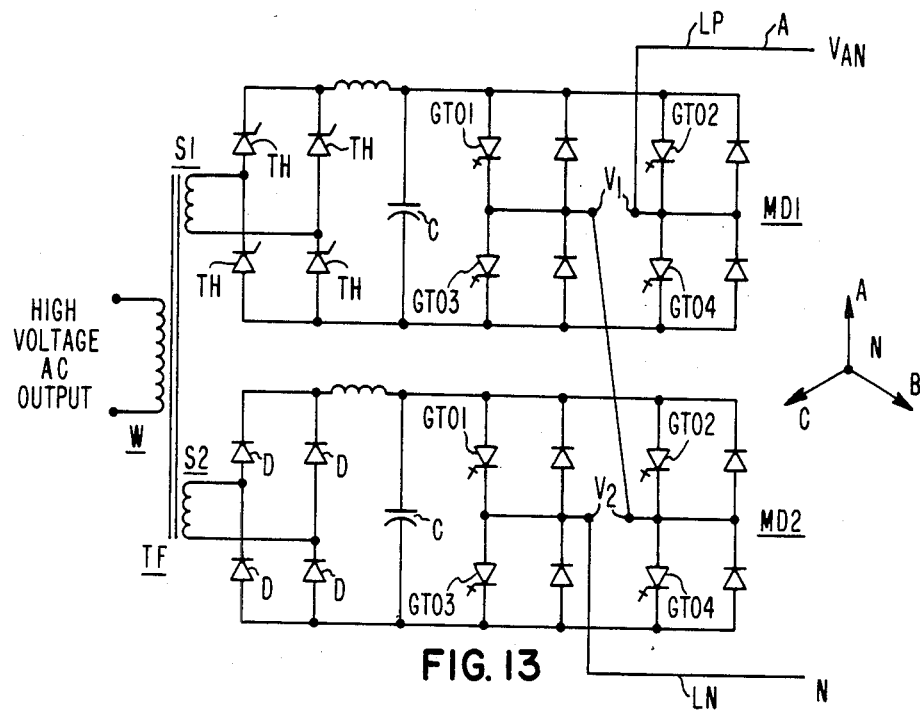
FIG. 13 shows a modification of FIG. 12 by control of the dc link voltage of one of the paired modules, independently.

Referring to FIG. 13, the AVI system of FIG. 12 is modified in that, the primary side rectifying thyristors are dispensed with, voltage control being effected by using thyristors TH (instead of diodes D) on a selected one or more (MD1 in the illustration) of the modules of the string (MD1 and MD2) of inverter modules.

With this method, the AC input of the transformer TF is not controlled, whereas the output thereof is being controlled in a two-part fashion: (1) by selecting the number of inverter modules producing output, and (2) by varying the output of one (or more) of the series modules through a variable DC link to control the output voltage.

As shown in FIG. 13, MD2 is unregulated so that its output V2 will be either maximum or zero. Thus, if $GTO_3$ and $GTO_4$ are ON and $GTO_1$ $GTO_2$ are OFF, the module provides zero output, but allows the flow of current to the neutral point N. If $GTO_1$ and $GTO_4$ are gated ON and OFF, together but in opposite phase to $GTO_2$ and $GTO_3$, then a square wave of voltage output is produced and added to the output V1 of the controlled inverter MD1. To avoid output voltage transients, appropriate switching controls (for instance) incorporating hysteresis are used to control the instants at which the switching inverter is activated.

Control of the thyristors will effect voltage control for the overall assembly output, on a per-phase fashion (as shown for phase A in FIG. 13). It is understood that control is intended to be based on the selection of one, or more, modules in each string, thereby to allow a margin of voltage correction, as desirable. For instance, in the case of FIGS. 6 and 7, control can be optionally effected only on the central unit (Y-connected three-phase module in FIG. 6, delta-connected three-phase module in FIG. 7).

Still another mode of controlling the output voltage on one, or more, modules of the overall high tension modular inverter system according to the invention, is to take advantage of the DC link on selected module, or modules, and to control the GTO devices thereof with the assist of a pulse-width-modulator control circuit. In such case, the multimodule inverter of FIG. 12 will have no thyristors on the primary side of the power supply transformer TF, and the multimodule inverter of FIG. 13 will have no thyristors on the voltage source side of the DC link, but rather diodes D in module MD1, like in module MD2.

Figure 13A:
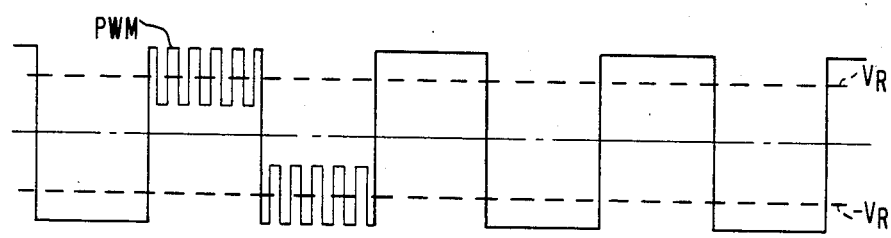
FIG. 13A illustrates a way of controlling the output voltage of pulse-width modulating one or more modules.

Referring to FIG. 13A, modulation of MD1 through the GTO devices thereof will lead to a voltage V1 on the central points of the module which looks as shown by curve (a), if at the same time in module MD2, $GTO_3$ and $GTO_4$ are ON while $GTO_1$ and $GTO_2$ are OFF, thereby to establish the positive and negative terminal TA, TB between the upper terminal of MD1 and the lower terminal of MD2. The second mode of control proposed here, is to have $GTO_1$ and $GTO_4$ ON and OFF, while $GTO_2$ and $GTO_3$ are OFF and ON in the same duty cycle, thereby establishing a square wave which is added to the PWM-modulated square wave of module MD1. The effect on the positive side is $+V_R$ and on the negative side the effect is $-V_R$ as shown in FIG. 13A, for the average, or regulated voltage.

Figure 14:
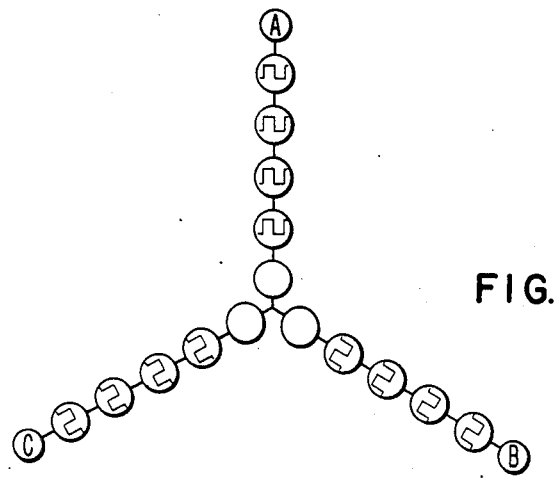
FIG. 14 illustrates with a Y-connected, string-like arrangement of single-phase inverter modules, voltage control by selective control of one or more of said inverter modules.

It is appreciated that these approaches can each be extended to any number of series modules with any appropriate control means. Also due to the simple duty operation of the switched inverted, which operate with fixed voltage DC link, simple thyristors for the inverters may be used, instead of GTO's. Typically if there are n modules, the power rating of each can be made equal to 1/n but this is not essential. An example of realization providing a 4160 V variable frequency output with a total of n (typically) 30 poles, is shown in FIG. 14. In this arrangement, the voltage control modules are shown at the center of the wye output and, to help control the transient switching, the control modules are given a 28% greater output voltage capability than the four single-phase switched inverters in each phase of the three-phase output.

To obtain a three-phase 4160 V output, the fundamental component of output voltage is 2402 V/phase. Using a 650 V DC link for the voltage-controlled inverters enables them to produce a fundamental component of 585 V; thus, the single-phase switched inverters are selected to each produce 455 V. This can be obtained with a DC link voltage of 505 V to each single-phase inverter. Assuming the use of 300 A GTO poles with a GTO rms current rating of 100A, the maximum output capability from a total of n=30 poles is about 1 MVA. Allowing for design margins, this is quite adequate for at least an 800 hp variable-speed pump drive.

Tripler harmonics in the square wave, when the phase voltages are well balanced, will be practically eliminated from the line voltages. Thus, the line output voltages are typical of a six-step inverter. When the controlled inverter is an adjustable voltage type, the output will include harmonics of (6K+1) times the output frequency.

Unique advantages in simplicity and performance are derived. When the output voltage is low, the load current is reflected into the input power lines via a step-down transformer; thus, kVAR and harmonics at low output speeds are significantly reduced and the power factor is improved.

With a combination of switched and controlled inverters, regulation of the output is achieved with the benefit of power circuit simplification and cost reduction. Also, in the case of PWM control, motor losses and noise are much reduced.

The control technique is applicable to a wide range of different pulse number and circuit output connections. It is also possible to distribute the overall inverter losses between the switching devices by multiplexing, so that some GTO's and inverters will assume the role of a shorting switch, or of voltage control.

We claim:

1. In a high voltage modular multi-inverter system, the combination of individual modules each comprising a DC voltage source having positive and negative DC terminals, a pole combination of serially connected power switches connected between said DC terminals about a center tap junction point and an output line derived from said center tap junction point, and control means for controlling for conduction said power switches to alternately connect said DC terminals to said output line at a predetermined selectable frequency;
with two of said modules being associated in parallel as a pair to form between corresponding two said output lines an elementary phase output;
a plurality of said pairs of modules being connected in series to develop a series output combining the same plurality of said elementary phase outputs in series, whereby a high-voltage resultant phase output is obtained.

2. The multi-inverter system of claim 1 with another plurality of such said series-connected pairs of modules being provided to form a polyphase output combining such said high-voltage resultant phase outputs.

3. The multi-inverter system of claim 1 with three of said modules being associated as a threesome to form each between corresponding DC terminals, a three-phase module.

4. The multi-inverter system of claim 3, with said threesome combination of modules forming with said output lines a Y-connected three-phase module.

5. The multi-inverter system of claim 3 with said threesome combination of modules forming with said output lines a delta-connected three-phase module.

6. The multi-inverter system of claim 4 with a plurality of such said series-connected pairs of modules being provided on each phase of said Y-connected three-phase module.

7. The multi-inverter system of claim 5 with a plurality of such said series-connected pairs of modules being provided on each phase of said delta-connected three-phase module.

8. The multi-inverter system of claim 1 with at least two pluralities of said pairs of modules being provided, said pairs of modules being connected in series within a corresponding one of said two pluralities, the phasing of said modules being different from one plurality to the other.

9. The multi-inverter system of claim 1 with the resulting phase output voltage of said plurality of pairs of modules being controlled by regulating the voltage between the DC terminals of at least one of said pairs.

10. The multi-inverter system of claim 9 with said power switches being GTO devices, said DC terminals being supplied with DC voltage by thyristor-controlled means, said thyristor-controlled means being controlled to adjust said DC voltage.

11. The multi-inverter system of claim 1 with the resulting phase output voltage of said plurality of pairs of modules being controlled by controlling the inverter switches of at least one of said pairs.

12. The multi-inverter system of claim 11, with the inverter associated with said at least one pair being controlled by pulse-width modulation.

13. The multi-inverter system of claim 9 with said power switches being transistor devices, said DC terminals being supplied with DC voltage by thyristor-controlled means, said thyristor-controlled means being controlled to adjust said DC voltage.

* * * * *